(12) United States Patent
Quinn et al.

(10) Patent No.: US 11,156,729 B1
(45) Date of Patent: Oct. 26, 2021

(54) PASSIVE SENSOR FOR MEASURING IONIZING RADIATION

(71) Applicant: United States of America as Represented by the Administrator of NASA, Washington, DC (US)

(72) Inventors: Jacqueline W. Quinn, Titusville, FL (US); Robert W. DeVor, Titusville, FL (US); Phillip R. Maloney, Orlando, FL (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 0 days.

(21) Appl. No.: 17/022,068

(22) Filed: Sep. 15, 2020

Related U.S. Application Data

(60) Provisional application No. 62/900,825, filed on Sep. 16, 2019.

(51) Int. Cl.
  *G01T 1/20* (2006.01)
  *G01T 1/203* (2006.01)
  *G01K 11/26* (2006.01)

(52) U.S. Cl.
  CPC .......... *G01T 1/2033* (2013.01); *G01K 11/265* (2013.01)

(58) Field of Classification Search
  CPC .................. G01T 1/2033; G01K 11/265
  See application file for complete search history.

(56) References Cited

U.S. PATENT DOCUMENTS

| | | | | |
|---|---|---|---|---|
| 4,435,441 A | * | 3/1984 | Mariani | H03H 3/10 310/313 R |
| 4,620,167 A | * | 10/1986 | Brooks | G01R 23/17 310/313 D |
| 8,596,862 B1 | | 12/2013 | Pfeifer et al. | |
| 9,477,857 B2 | | 10/2016 | Youngquist et al. | |
| 2018/0329271 A1 | * | 11/2018 | Frank | G02F 1/335 |

* cited by examiner

*Primary Examiner* — Hugh Maupin
(74) *Attorney, Agent, or Firm* — Jonathan J. Leahy; Mark Homer

(57) ABSTRACT

The present invention is a passive sensor to detect ionizing radiation over time. It employs a SAW sensor that incorporates a polymer film that deforms based on the chain-scission reaction as described upon irradiation. The polymer film coats the piezoelectric substrate and reflectors on the SAW sensor and, as it reacts to radiation, the film deforms due to the fracturing of the polymer molecules resulting in a loss of overall mass. As the SAW sensor is interrogated by an electrical signal, the wavelength of the response will change as the overall rigidity of the polymer film changes allowing for the detection of the level of radiation.

14 Claims, 3 Drawing Sheets

PASSIVE SENSOR FOR MEASURING IONIZING RADIATION

CROSS REFERENCE TO RELATED APPLICATIONS

This application claims the benefit of priority under 35 U.S.C. § 119(e) from U.S. Provisional Patent Application Ser. No. 62/900,825 filed on Sep. 16, 2019, the contents of which are incorporated herein by reference.

ORIGIN OF THE INVENTION

The invention described herein may be manufactured and used by or for the Government of the United States of America for governmental purposes without payment of any royalties thereon or therefor.

BACKGROUND OF THE INVENTION

1. Field of the Invention

The present invention relates generally to passive acoustic wave sensors and more specifically to a passive acoustic wave sensor modified to detect ionizing radiation.

2. Description of the Related Art

Current state-of-the-art technologies employed for radiation detection and monitoring are inadequate and unable to perform real-time monitoring aboard spacecraft embarking on deep space missions. Dosimeters and Geiger counters are deficient for a few reasons. They are large, contain electronics, and results need to be post-processed off site. Size is a limiting factor for traditional equipment due to the size of the spacecraft.

Surface Acoustic Wave (SAW) sensors are a type of sensor that uses the modulation of surface acoustic waves to sense physical phenomenon. Most SAW sensors take advantage of the piezoelectric effect by taking an input interdigital transducer (IDT) to convert an electrical signal, usually in the form of an RF signal, into an acoustic wave, which, unlike an electrical signal, can be easily influenced by physical phenomena. The device then transduces this wave back into an electrical signal. Changes in amplitude, phase, frequency, or time-delay between the input and output electrical signals can be used to measure the presence of the desired physical phenomenon.

Hence, these sensors have been used routinely to detect such things as temperature, torque, strain, and pressure. More recently, such sensors have been modified to detect physical phenomena such as chemical and biological matter, humidity, magnetic fields, and viscosity.

In addition, U.S. Pat. No. 8,596,862, which is herein incorporated by reference, discloses a SAW sensor that has been modified to detect the presence of ionizing radiation. The patent discloses a passive SAW sensor that incorporates an electrically conductive metal halide film which is electrically connected to the reflection IDT. When radiation is present, the metal halide film forms catalytic sites where the electrons are ionized to create a cascade reaction that converts the film from dielectric to conductive. Basically, this turns the sensor from "off," meaning no radiation is present, to "on," meaning that radiation is present.

While this type of radiation sensor provides a small, low-cost method of detecting whether radiation was present in a specific location, it does not provide information about the amount of radiation over time in that location.

Therefore, it is desired to provide a passive radiation sensor that is small, low cost, and can detect specific amounts of ionizing radiation over time.

SUMMARY OF THE INVENTION

The invention described herein comprises a modified SAW sensor that requires no external power source and can detect ionizing radiation.

Accordingly, it is an objective of this invention to provide a small, low-cost sensor that can detect ionizing radiation.

It is another objective to provide an ionizing radiation sensor that can detect specific amounts of ionizing radiation over time.

It is a further objective to provide an ionizing radiation sensor that can detect specific amounts of ionizing radiation across a three-dimensional volume.

This invention meets these and other objectives related to passive ionizing radiation sensors by providing a wireless passive radiation sensor comprising a piezoelectric substrate having an interdigital transducer (IDT) disposed on its surface. The IDT is in electrical connection with an antenna. When the antenna receives an electrical signal, the IDT launches a surface acoustic wave at a resonance frequency through the piezoelectric substrate. One or more reflectors are also disposed on the surface of the piezoelectric substrate that are located so they can at least partially reflect the acoustic wave back toward the antenna, creating an output signal at the resonance frequency. Finally, a polymer film that deforms in the presence of radiation is disposed on the surface of the piezoelectric substrate that partially covers the one or more reflectors. When the polymer film deforms it changes the physical characteristics of the polymer film. This, in turn, changes the frequency of the output signal when the sensor is interrogated via providing an electrical signal via the antenna, allowing one to determine the amount of radiation to which the sensor was subjected.

BRIEF DESCRIPTION OF THE DRAWINGS

In the drawings, which are not necessarily to scale, like or corresponding parts are denoted by like or corresponding reference numerals.

DETAILED DESCRIPTION OF THE INVENTION

Figure 1A:
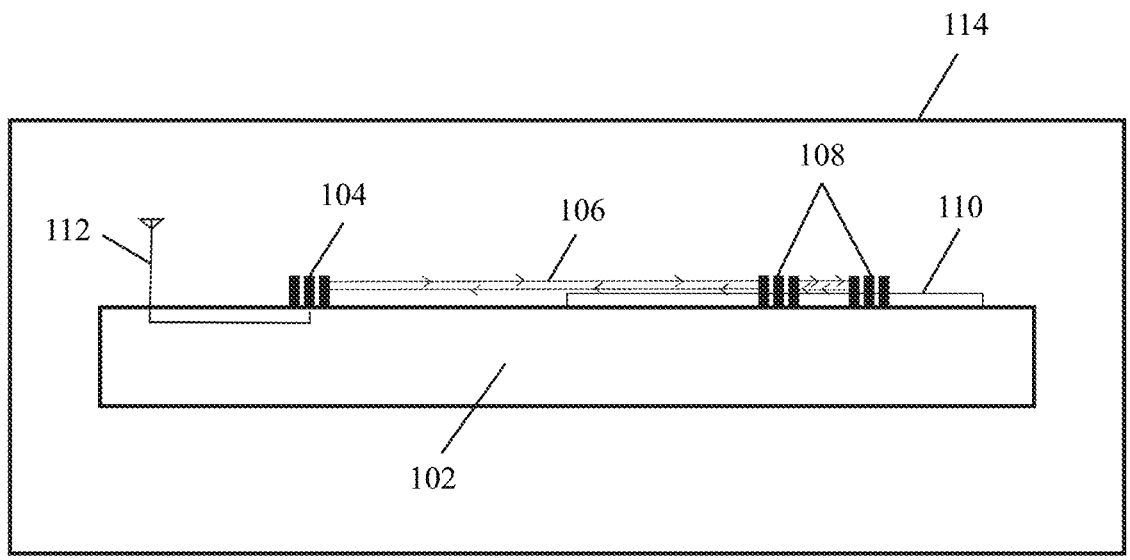
FIG. 1a depicts a side view of an embodiment of the present invention.

Space radiation has the ability to damage spacecraft hardware, from bit flipping in electronics to degradation of pressure bladders in spacesuits. Radiation also poses serious health implications to deep-space crews. Therefore, it is important for space environments to provide radiation sensors that can accurately measure the amount of radiation over time at specific locations or on personnel in nearly real-time.

As with any type of hardware designed for space applications, it is also very important that any such devices be lightweight, compact, physically hardened, and require very low or no power.

Polymers exhibit a wide variety of radiation effects. After irradiation, the formation of new chemical bonds in polymers usually results in irreversible effects. The effects manifest themselves as changes in appearance, chemical and, physical states, along with changes to mechanical, electrical, and thermal properties. Not all properties of polymers are affected by radiation equally.

Irradiated polymers undergo two types of reactions: cross linking and chain scission. Chain scission, which is the fracturing of polymer molecules, modifies the physical properties of the polymer such as changing the rigidity of the polymer or decreasing the polymer's weight and increasing solubility. Cross linking is a process that results in a formation of chemical bonds between two adjacent polymer molecules; the ending result is the polymer increases in molecular weight until the material is eventually bound into an insoluble three-dimensional network. Both chain-scission and cross-linking reactions can significantly alter the physical properties of a polymer.

The present invention is a passive sensor to detect ionizing radiation over time. It employs a SAW sensor that incorporates a polymer film that deforms based on the chain-scission reaction described above upon irradiation. The polymer film coats the piezoelectric substrate and reflectors on the SAW sensor and, as it reacts to radiation, the film deforms due to the fracturing of the polymer molecules. As the SAW sensor is interrogated by an electrical signal, the wavelength of the response will change as polymer molecules are fractured.

The amount of radiation that the sensor is exposed to may be calculated based on the change in wavelength produced. Therefore, each time the sensor is interrogated, a user may calculate the amount of radiation the sensor has been exposed to during the period of time between interrogations.

For the purposes of this application, the word interrogation means sending an electrical signal to the IDT on the SAW sensor to create an acoustic wave that is partially reflected back by the reflectors and receiving an output signal which is produced by the wave reflected by the reflectors and reduced back to an electrical signal by the IDT. The term deforms, as used in this application, means fracturing the polymer film molecules associated with chain-scission reaction discussed above.

The sensor described herein is based upon SAW sensors that are known in the art and may be practiced using known variations of those sensors. However, in a preferred embodiment of the invention, a reflective delay line SAW sensor is used. One example of a SAW sensor that may be used in the present invention can be found in U.S. Pat. No. 9,477,857, which is incorporated herein by reference.

The working principle of a reflective delay line SAW device is that the sensor is composed of a piezoelectric substrate with an interdigital transducer (IDT) and multiple reflectors embedded in a specific pattern over it. The IDT receives a single electromagnetic impulse. The IDT initiates an acoustic wave that propagates through the piezoelectric substrate toward the reflectors. The reflector absorbs the acoustic wave and reflects back parts of the incoming wave. These reflections are converted into an electromagnetic signal by the IDT for transmission back to the interrogator unit.

Figure 1B:
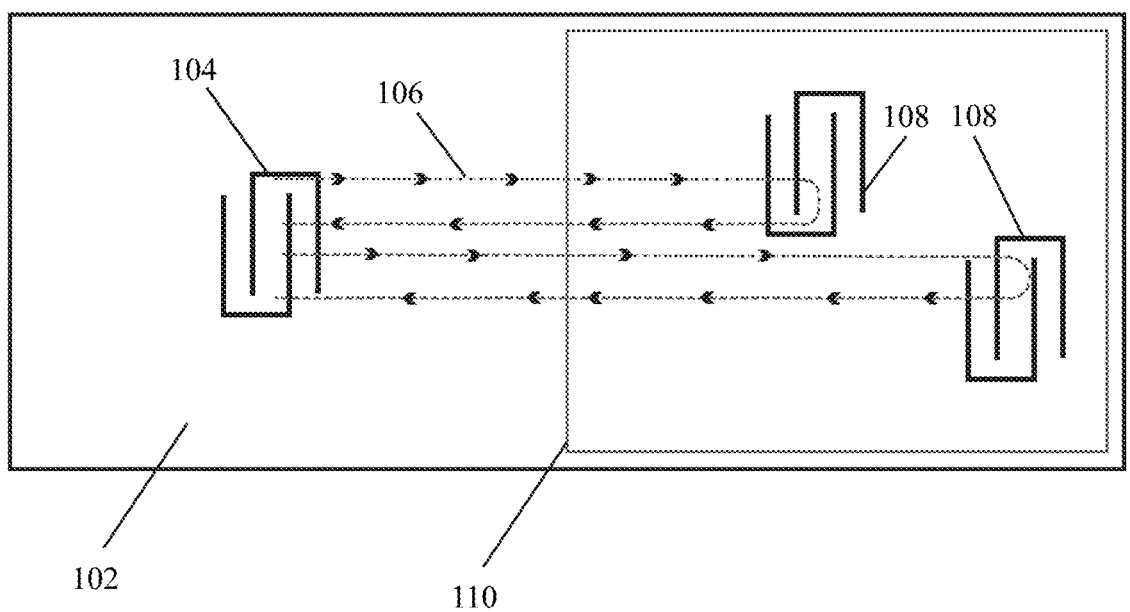
FIG. 1b depicts a top view of the embodiment of the invention shown in FIG. 1.

Referring to FIGS. 1a and 1b, the invention comprises a wireless passive radiation sensor comprising a piezoelectric substrate 102 having an interdigital transducer (IDT) 104 disposed on its surface. The IDT 104 launches a surface acoustic wave 106 at a resonance frequency in the piezoelectric substrate 102 in response to an electrical signal. One or more reflectors 108 are disposed on the surface of the piezoelectric substrate 102 in a position that at least partially reflect the acoustic wave 106 back toward the IDT 104. The IDT 104 takes the partially reflected acoustic wave 106 and converts it back to an electrical signal, which becomes the output signal for the sensor, at the resonance frequency.

A polymer film 110 that deforms in the presence of radiation is also disposed on the surface of the piezoelectric substrate 102 that partially covers the one or more reflectors 8, but does not cover the IDT 104. In operation, the sensor functions by providing the wavelength frequency change over time created by the deformation of the polymer film 10.

The piezoelectric substrate 102 may be made of any materials, normally with a high mechanical coupling coefficient that are normally used by one of ordinary skill in the art in SAW sensors. Examples of such materials include LiNbO3, LiTaO3, GaAs, quartz, and the like.

The IDT 104 must be able to launch an acoustic wave 106 in the piezoelectric substrate 10 upon receipt of an electrical signal. In a preferred embodiment, the IDT 104 is an electrode that is produced in a fingerlike parallel pattern through photo lithography, or similar process, on the surface of the piezoelectric substrate 102.

The reflectors 108 must be able to at least partially reflect the acoustic wave 106 back toward the IDT 104 and are also preferably electrodes, which may be in the same configuration of the IDT 104, and may be placed on the surface of the piezoelectric substrate 102 in the same fashion as the IDT 104. While the present invention may be practiced with one reflector 8, it is preferable to have more than one reflector 8, each placed a different delay length from the IDT 104.

The polymer film 110 should comprise a material that deforms in the presence of ionizing radiation. Some examples of polymers that degrade in the presence of ionizing radiation include certain polyethers (polymethyl methacrylate, polyethylene, polypropylene, polyvinylchloride, polytetrafluoroethylene, ethylene propylene diene monomer rubber, etc.), phenyl epoxy, nylon, cellulose acetate, silicone, neoprene, nitrile, butyl, polystyrene and polyvinyl acetate polymer blends; however, other polymers that deform in the presence of ionizing radiation known in the art may be employed in the present invention. A preferred polymer film 110 for the present invention is polymethyl methacrylate.

This selected thickness for the polymer film 110 is based on the maximum thickness that would not impede the sensor's signal transmission and the minimum thickness viable for excited particles of ionized radiation to effect the film 10. The thinner the polymer film 110 selected, the better for signal transmission; however, the thicker polymer film 110 selected, the better chance there is for ionized particles to effect it. Based on this general guidance, a preferred thickness of the polymer film 110 for the present invention ranges from about 300-2000 angstroms; a more preferred thickness ranges from about 300-850 angstroms; and a most preferred thickness ranges from about 500-700 angstroms.

It is preferable that the polymer film 110 of the present invention be non-conductive. This is because a polymer film 110 that is conductive could absorb or deflect energy particles differently than a non-conductive polymer film 110 and that could hinder the sacrificial ability of the material that causes it to deform.

The polymer film 110 can be deposited on the piezoelectric substrate 102 using techniques known by those skilled in the art to deposit thin films onto substrates. These may include techniques such as initiated chemical vapor deposition or photo vapor deposition.

The present invention may also include an antenna 112 or similar structure in electrical connection to the IDT 104 to transmit the electrical signal to the IDT 104. The electrical signal is preferably provided via a radio frequency or similar transmission known to those in the art and used to interrogate SAW sensors. The antenna 112 can also be used to take the output signal from the IDT 104 and transmit it wirelessly.

Finally, the invention may also include a hermetically sealed casing 114 surrounding the piezoelectric substrate 102 in order to ensure physical protection of the device during deployment/use.

In general, the present invention operates the same as a conventional reflective delay line SAW sensor. SAW sensor components transform electromagnetic energy into acoustic waves propagating on the surface of a piezoelectric substrate. Reflective delay line type SAW sensors have acoustical reflectors on the surface of the substrate, producing delayed reflections of the pulse that is used for interrogation based on the reflector placement. The output data is resolved either by directly measuring its time response with a pulsed signal or performing the measurements in the frequency domain and reconstructing the time response with a Fourier transform.

Figure 2:
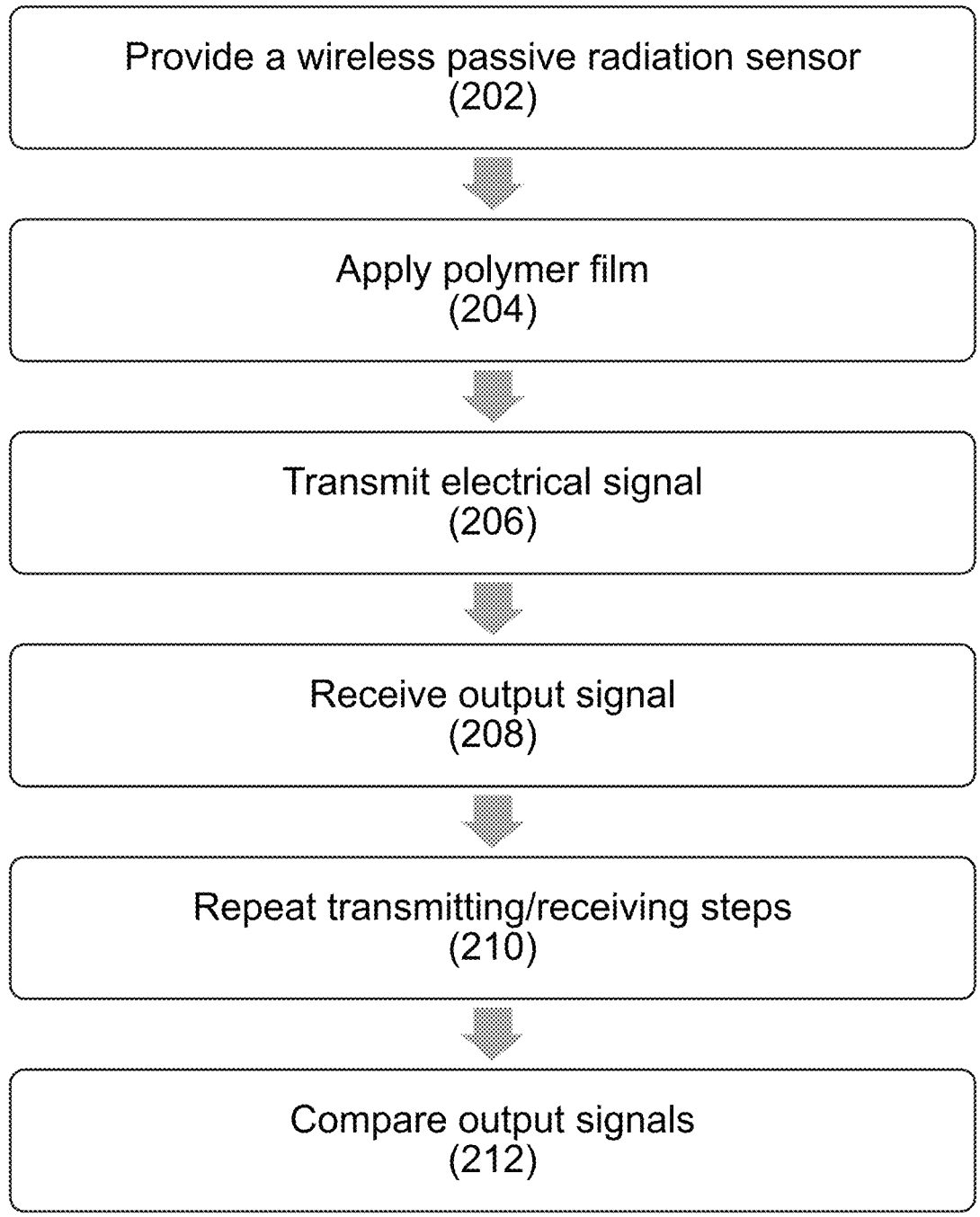
FIG. 2 depicts a flow chart of the steps to use the present invention to detect ionizing radiation.

As such, the present invention operates to detect radiation as follows. Referring to FIG. 2, the first step 202 is to provide a wireless passive radiation sensor comprising a piezoelectric substrate with an interdigital transducer disposed thereon and one or more reflectors disposed opposite the interdigital transducer. The next step 204 is to apply a polymer film that deforms in the presence of radiation to the piezoelectric substrate that partially covers the one or more reflectors. Once this is accomplished, one has the sensor of the present invention.

The next step 206 is to transmit an electrical signal to the interdigital transducer which propagates an acoustic wave through the piezoelectric substrate. The acoustic wave is at least partially reflected back by the one or more reflectors as an output signal. The next step 208 is to receive the output signal wirelessly.

The next step 210 is to repeat the transmitting and receiving steps. This provides a second output signal wirelessly. This enables the final step 212, which is to compare output signals received to determine the amount of radiation to which the sensor has been subjected.

A user may repeat the process, which is basically to interrogate the sensor, repeatedly to get near real-time information about the amount of radiation to which the sensor has been subjected. This allows for near real-time radiation detection as well as cumulative radiation detection capabilities.

Finally, the invention includes a method to calculate radiation exposure across a three-dimensional volume, such as a room. In general, a user may position ionizing radiation sensors as described herein across a three-dimensional volume, interrogate the sensors, and calculate the level of radiation across the volume. The more sensors that are deployed and the more uniformly across the volume they are placed, the more accurate of an overall reading a user may obtain. However, the method may be practiced with as few as two sensors placed, for example, on opposite sides of the volume.

Figure 3:
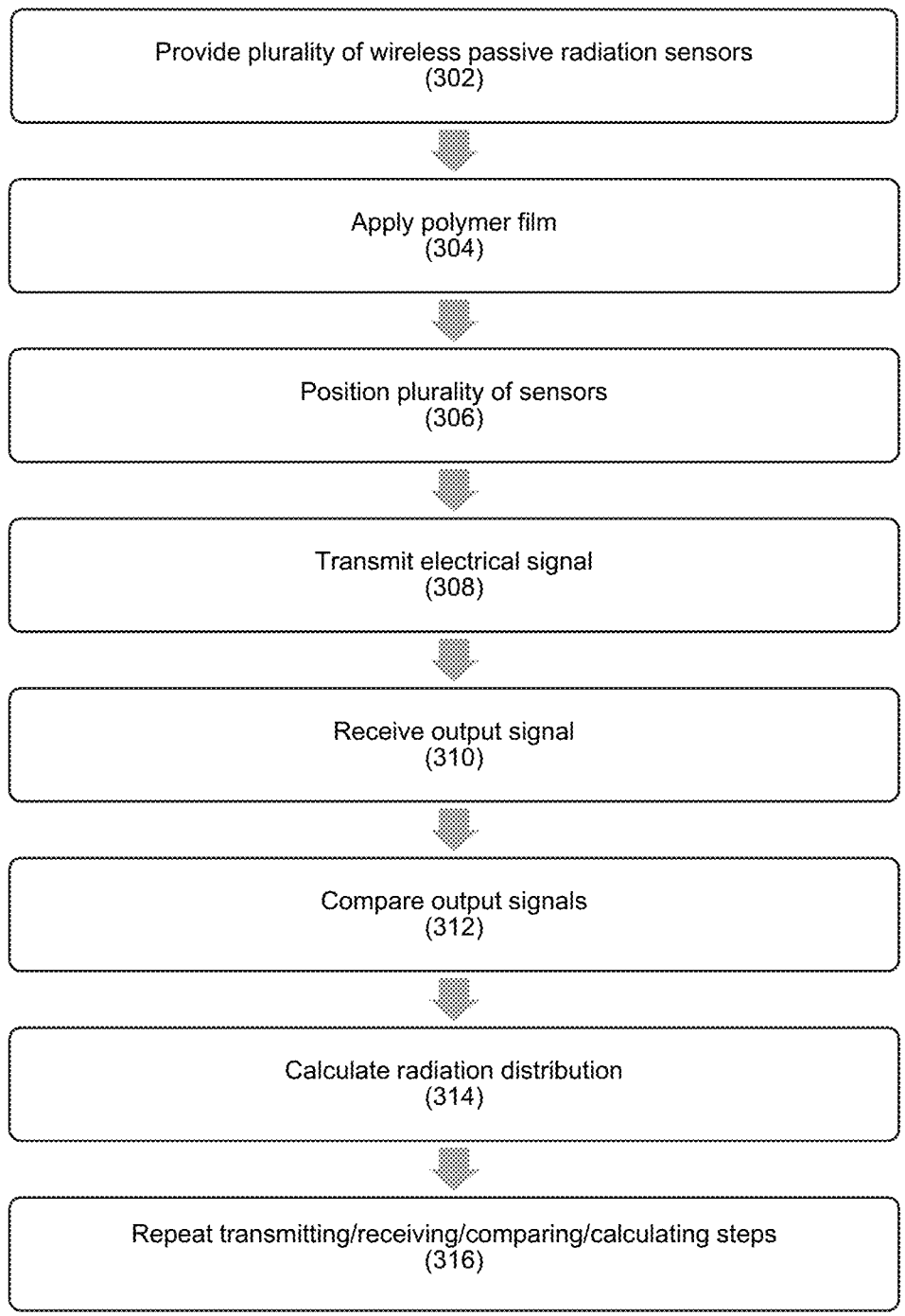
FIG. 3 depicts a flow chart of the steps to use the present invention to detect ionizing radiation across a three-dimensional volume.

More specifically, and referring to FIG. 3, the first step 302 of detecting radiation across a three-dimensional volume is to provide a plurality of wireless passive radiation sensors comprising a piezoelectric substrate with an interdigital transducer disposed thereon and one or more reflectors disposed opposite the interdigital transducer.

The next step 304 is to apply a polymer film on each of the plurality of sensors that deforms in the presence of radiation to the piezoelectric substrate that partially covers the one or more reflectors.

The next step 306, as noted above is to position the plurality of sensors across the three-dimensional volume at user desired locations.

The next step 308 is to transmit an electrical signal to the interdigital transducers of each of the sensors which propagates an acoustic wave through the piezoelectric substrate and is at least partially reflected back by the one or more reflectors as an output signal. The following step 310 is to receive the output signal for each of the sensors wirelessly; followed by step 312 which is to compare the output signals of the sensors to determine a level of radiation exposure at each sensor location.

Step 314 is to calculate the radiation distribution across the three-dimensional volume using the output signals, positions of the sensors, and volume data. The final step 316 is to repeat the transmitting, receiving, comparing, and calculating steps as desired.

In this way, one can obtain information related to which areas in a three-dimensional volume or room are exposed to the most radiation.

What is described herein are specific examples of many possible variations on the same invention and are not intended in a limiting sense. The claimed invention can be practiced using other variations not specifically described above.

We claim:

1. A wireless passive radiation sensor, comprising:
a piezoelectric substrate;
an interdigital transducer disposed on a surface of the piezoelectric substrate that launches a surface acoustic wave at a resonance frequency through the piezoelectric substrate in response to an electrical signal;
one or more reflectors disposed on the surface of the piezoelectric substrate that at least partially reflect the acoustic wave back toward the interdigital transducer, creating an output signal; and,
a polymer film, comprising a thickness of about between 300 and 2000 angstroms, that deforms in the presence of radiation disposed on the surface of the piezoelectric substrate that partially covers the one or more reflectors, wherein deforming the polymer film modifies the resonance frequency of the output signal.

2. The wireless passive radiation sensor of claim 1 wherein the polymer film comprises a non-conductive polymer film.

3. The wireless passive radiation sensor of claim 1 wherein the polymer film is selected from the group comprising polymethyl methacrylate, polyethylene, polypropylene, polyvinylchloride, polytetrafluoroethylene, and ethylene propylene diene monomer rubber) phenyl epoxy, nylon, cellulose acetate, silicone, neoprene, nitrile, butyl, polystyrene, polyvinyl acetate polymer blends and combinations thereof.

4. The wireless passive radiation sensor of claim 1 wherein the polymer film comprises polymethyl methacrylate.

5. The wireless passive radiation sensor of claim 1 further comprising an antenna disposed on the surface of the piezoelectric substrate in electrical connection with the interdigital transducer to receive the electrical signal and the output signal.

6. The wireless passive radiation sensor of claim 1 comprising two reflectors, each spaced a different delay length from the interdigital transducer.

7. The wireless passive radiation sensor of claim 1 further comprising a hermetically sealed casing surrounding the piezoelectric substrate.

8. A method of detecting radiation, including the steps of:
- providing a wireless passive radiation sensor comprising a piezoelectric substrate with an interdigital transducer disposed thereon and one or more reflectors disposed opposite the interdigital transducer;
- applying a polymer film, comprising a thickness of about between 300 and 2000 angstroms, that deforms in the presence of radiation to the piezoelectric substrate that partially covers the one or more reflectors;
- transmitting an electrical signal to the interdigital transducer which propagates an acoustic wave through the piezoelectric substrate and is at least partially reflected back by the one or more reflectors as an output signal;
- receiving the output signal wirelessly;
- repeating the transmitting and receiving steps; and,
- comparing output signals received to determine an amount of radiation to which the sensor has been subjected.

9. The method of detecting radiation of claim 8 wherein the polymer film comprises a non-conductive polymer film.

10. The method of detecting radiation of claim 8 wherein the polymer film comprises polymethyl methacrylate.

11. The method of detecting radiation of claim 8 wherein the sensor further comprises an antenna in electrical connection with the interdigital transducer to wirelessly receive the electric signal and provide it to the interdigital transducer and receive the output signal.

12. The method of detecting radiation of claim 8 wherein the sensor comprises two reflectors, each spaced a different delay length from the interdigital transducer.

13. The method of detecting radiation of claim 8 wherein the sensor further comprises a hermetically sealed casing surrounding the piezoelectric substrate.

14. A method of detecting radiation across a room, comprising the steps of:
- providing a plurality of wireless passive radiation sensors comprising a piezoelectric substrate with an interdigital transducer disposed thereon and one or more reflectors disposed opposite the interdigital transducer;
- applying a polymer film, having a thickness of about between 300 and 2000 angstroms, on each of the plurality of sensors that deforms in the presence of radiation to the piezoelectric substrate that partially covers the one or more reflectors;
- positioning the plurality of sensors across the room;
- transmitting an electrical signal to the interdigital transducers of each of the sensors which propagates an acoustic wave through the piezoelectric substrate and is at least partially reflected back by the one or more reflectors as an output signal;
- receiving the output signal for each of the sensors wirelessly;
- comparing the output signals of the sensors to determine a level of radiation exposure at each sensor location;
- calculating the radiation distribution across the room using the output signals, positions of the sensors, and volume data; and,
- repeating the transmitting, receiving, comparing, and calculating steps as desired.

\* \* \* \* \*